(12) United States Patent
Kimura et al.

(10) Patent No.: US 8,767,204 B2
(45) Date of Patent: Jul. 1, 2014

(54) SPECTROPHOTOMETER

(75) Inventors: Toshiro Kimura, Kyoto (JP); Hiroyuki Yoshimura, Kusatsu (JP)

(73) Assignee: Shimadzu Corporation, Kyoto-Shi (JP)

( * ) Notice: Subject to any disclaimer, the term of this patent is extended or adjusted under 35 U.S.C. 154(b) by 0 days.

(21) Appl. No.: 13/493,736

(22) Filed: Jun. 11, 2012

(65) Prior Publication Data

US 2013/0003060 A1 Jan. 3, 2013

(30) Foreign Application Priority Data

Jun. 29, 2011 (JP) .................................. 2011-144441

(51) Int. Cl.
*G01J 3/42* (2006.01)
*G01J 3/08* (2006.01)
*G01J 3/02* (2006.01)

(52) U.S. Cl.
CPC .. *G01J 3/08* (2013.01); *G01J 3/027* (2013.01); *G01J 3/42* (2013.01)
USPC ........................................................ 356/319

(58) Field of Classification Search
CPC ........................................................ G01J 3/08
USPC ................................................ 356/402–425
See application file for complete search history.

(56) References Cited

U.S. PATENT DOCUMENTS

| 4,775,234 | A | * | 10/1988 | Shimomura | 356/328 |
| 5,311,292 | A | * | 5/1994 | Sato et al. | 356/406 |
| 2003/0103210 | A1 | * | 6/2003 | Rapp et al. | 356/456 |
| 2008/0192249 | A1 | * | 8/2008 | Babichenko et al. | 356/318 |

FOREIGN PATENT DOCUMENTS

| JP | 2005-241551 | 9/2005 |
| JP | 2007-033292 | 2/2007 |

OTHER PUBLICATIONS

Of Bruker Optik "IFS 66v/S", 1998.*

* cited by examiner

*Primary Examiner* — Gregory J Toatley
*Assistant Examiner* — Maurice Smith
(74) *Attorney, Agent, or Firm* — Bingham McCutchen LLP

(57) ABSTRACT

A spectrophotometer 10 includes built-in detector 24 and external detector 32. When a mountable/removable optical path switcher 23a is installed in a specimen chamber 23, measurement based on detection signals from built-in detector 24 is replaced by measurement based on detection signals from external detector 32. The spectrophotometer further includes a measurement data threshold-value storage unit 51 that stores threshold value T for measurement data from built-in detector 24 or external detector 32, and a light-receiving detector recognition unit 52 that recognizes which detector is able to receive the measuring light beam based on the results of a comparison between threshold value T and measurement data from built-in detector 24 or external detector 32 while the measuring light beam is being introduced into specimen chamber 23.

5 Claims, 6 Drawing Sheets

SPECTROPHOTOMETER

CROSS-REFERENCE TO THE RELATED APPLICATIONS

This application claims the benefit of priority under 35 USC 119 to Japanese Patent Application No. 2011-144441, filed on Jun. 29, 2011, the entire contents of which are incorporated herein by reference.

FIELD OF THE INVENTION

The present invention relates to spectrophotometers capable of performing spectrometry using an accessory equipped with an external detector.

BACKGROUND ART

In general, general-purpose spectrophotometers have light sources, spectrometers, specimen chambers, detectors, signal amplifiers, controllers and the like built into the spectrophotometer unit. Optical components such as holders for holding specimens in the optical path over which a measuring light beam passes are mounted in a specimen chamber such that they can be mounted or removed. The specimen is placed in the optical path using these components, the measuring light beam is radiated in the wavelength range suited to the measurement purpose, transmitted light is guided to a detector where it is detected as a detection signal (electrical signal), signal processing and operations such as amplification and A/D conversion are conducted, and transmittance and absorbance are calculated. Measurement results can then be obtained by displaying measurement data such as transmittance and absorbance on a monitor screen.

In recent spectrophotometers, a variety of accessories that can be optionally mounted and removed has been provided to match the specimen size, shape, number, measurement purpose, measurement method, and the like. By selecting these accessories as needed and mounting them in the spectrophotometer unit, the desired measurements can be accurately and easily performed.

When mounting accessories in the spectrophotometer unit and conducting measurements, measuring without being aware that these accessories have been mounted may lead to mistakes in input settings and operation of the spectrophotometer, and cause mistaken measurement data to be output.

For that reason, the installation of accessory recognition mechanisms such as electrical contacts for recognizing accessories at specific locations on accessories and corresponding specific locations on the spectrophotometer unit has been disclosed (Patent Literature 1).

Spectrophotometers have also been disclosed wherein the accessories themselves have IC chips (ID tags) that store information about the accessory and identify their configuration. When the accessory is mounted in the specimen chamber, the accessory information is read by a reading means installed in the specimen chamber of the spectrophotometer unit and the information is sent to a control computer (Patent Literature 1 and 2).

The devices described in the Patent Literature mentioned above use the same detector built into the spectrophotometer unit regardless of whether accessories are installed or not. Accordingly, measurement is conducted by built-in detectors at settings that correspond to either accessories being mounted or not being mounted, using the accessory recognition mechanisms of the spectrophotometer unit to recognize whether or not an accessory is currently present.

As it happens, integrating spheres may be used as accessories, for example, when measuring diffuse reflectance of specimen surfaces. Since integrating spheres must be placed close to detectors, measurements are conducted using an external detector and not using the built-in detector.

When an accessory having an external detector is mounted in the main unit of a spectrophotometer, measurements are conducting using either the built-in detector or the external detector.

FIG. 5 is a schematic that shows one example of an external accessory of this type mounted in the specimen chamber of spectrophotometer M. FIG. 6 is a schematic that shows the state where no external accessory is mounted in spectrophotometer M (when measuring transmittance). Note that while actual measuring light beams often use a double beam of signal light beam and reference light beam, only the signal light beam is explained here, and the reference light beam is not explained here.

Spectrophotometer M comprises main unit 10, personal computer 11, which primarily conducts input and output necessary for measurement, and external accessory 12.

Main unit 10 is equipped with light source 21, spectrometer 22, specimen chamber 23, detector 24 (built-in detector), signal amplifier 25, A/D converter 26, controller 27 (firmware), wavelength stepping mechanism 22a of spectrometer 22, and a gain setting mechanism 29 for signal amplifier 25.

The light emitted from light source 21 (for example, a deuterium lamp) is divided into monochromatic light by spectrometer 22 using a diffraction grating and is guided through an input window disposed on the wall of specimen chamber 23 into the specimen chamber. Light source 21 adjusts the direction of the optical path using light source mirror 21a to send light into spectrometer 22. Spectrometer 22 uses wavelength stepping mechanism 22a, which adjusts the angle of the diffraction grating, to adjust the wavelength of the monochromatic light sent to specimen chamber 23.

Specimen chamber 23 is provided with an optical path switching mirror 23a (optical path switcher) at location P on the optical path that bends the direction of travel of the light to guide the light to external accessory 12. Location P can be positioned anywhere on the optical path, but in almost all devices, it is positioned where optical path switching mirror 23a can replace cell holder 23b for transmission measurement is installed for use during ordinary transmission measurement when no external accessory 12 is mounted (FIG. 6). A positioning part for mounting is formed on the bottom surface at the position where cell holder 23b is mounted, making it easy to be mounted.

Since the measurement optics switch after specimen chamber 23, the device configuration for ordinary transmission measurement is explained first. As shown in FIG. 6, light that travels straight through cell holder 23b at position P is emitted through an exit window disposed on the wall of specimen chamber 23, is guided to detector 24 (the built-in detector), and a detection signal is output.

The signal output from detector 24 is amplified by signal amplifier 25, whose amplification factor is adjusted to a desired factor by gain setting mechanism 29, and is sent via A/D converter 26 to controller 27 as a measurement data signal (digital data).

Some detectors, such as photomultiplier tubes, use a gain setting mechanism to adjust the amplification factor by controlling the negative high voltage of the photomultiplier tube.

Controller 27 is a so-called "firmware" that stores information such as programs and parameter settings required for control and controls the entire unit. The controller 27 also performs data processing on the measurement data that it receives and calculates transmittance, absorbance and the like.

Personal computer 11 displays the transmittance and absorbance measurement data calculated by controller 27 on a monitor screen in a prescribed format as the output data.

To be described next is the device configuration with external accessory 12 mounted in specimen chamber 23 of the spectrophotometer.

As shown in FIG. 5, light reflected by optical path switching mirror 23a (optical path switcher) disposed at position P is guided through incident window 31a of integrating sphere 31, which is an optical device of external accessory 12, and is output as a detection signal from detector 32 (external detector) installed in the wall of integrating sphere 31. The specimen is mounted in accessory 12.

The output signal from detector 32 is amplified using a desired amplification factor by signal amplifier 25 via external cable 33, connector 34, and internal cable 35, and is sent through A/D converter 26 to controller 27 as measurement data signal (digital data). Controller 27 also performs data processing on the measurement data signal and calculates transmittance, absorbance and the like. Output data for transmittance, absorbance and the like is displayed on the monitor screen of personal computer 11.

PRIOR ART LITERATURE

Patent Literature

Patent Literature 1: Unexamined Patent Application Publication No. 2005-241551
Patent Literature 2: Unexamined Patent Application Publication No. 2007-033292

OVERVIEW OF THE INVENTION

Problems to be Solved by the Invention

When a measurement system is configured to be equipped with an external detector 32 and built-in detector 24 such as the afore-described, whether or not an external accessory 12 is connected can be recognized by installing on the external accessory itself an accessory recognition mechanism such as the IC tag described above for the prior art. However, if no optical path switching mirror 23a (optical path switcher) is disposed on the optical path, the measuring light will not be available, and erroneous measurements will be made even if an external accessory and an external detector are connected.

In other words, erroneous operations cannot be prevented unless an optical path recognition mechanism for recognizing the mounting of an optical path switching mirror 23a is also installed together with the accessory recognition mechanism for recognizing the mounting of external accessory 12. This means that IC tag recognition mechanisms, for example, must be installed in two locations, increasing the number of components and the manufacturing cost.

Another method is available for using just one IC tag in one location. With this method, the optical path switching mirror 23a mounted in specimen chamber 23 is integrated as a single unit with external accessory 12 (and the external detector), and a optical path recognition mechanism that is installed solely for recognizing whether an optical path switching mirror 23a has been mounted can also recognize whether the optical path is set up to allow measurement using the external accessory. This allows only a single IC tag to be placed at only a single location. However, with this method, it is not possible to recognize whether the external accessory 12 (and the external detector) are in fact properly connected.

Moreover, even if only a single IC tag is installed, a reading mechanism for reading that tag information must be installed in the spectrophotometer unit, which increases the number of components as compared to not using IC tags and correspondingly increases the manufacturing cost.

Also, the mounting position for optical path switching mirror 23a is inside specimen chamber 23 in a location originally designed for mounting a specimen. So, this is a location that is prone to contamination by the specimen that may spill out and the like and is not desirable as a mounting position for mechanical or electrical recognition mechanism.

For that reason, it is the first object of the present invention to provide a spectrophotometer that is capable of recognizing the status of external accessories and optical path switching mirrors without adding IC tags or other mechanical or electrical recognition mechanisms (hardware resources) while being able to perform measurements using external accessories without misoperations.

A second object of the present invention is to provide a spectrophotometer that is capable, while keeping an external accessory (including an external detector) installed, of performing measurements using either an external detector or a built-in detector depending on whether an optical path switching mirror (optical path switcher) is used or not. At the same time, the spectrophotometer is also able to recognize which detector is in a state capable of performing measurements, thus eliminating errors in the performance of measurement operations.

Means for Solving the Problem

To solve the afore-described problems, the present invention enables automatic recognition of device status by adding and changing the software executed by a controller provided in the main unit of the spectrophotometer.

To explain, the spectrophotometer according to the present invention comprises a light source unit for forming a measuring light beam for spectrometry; a specimen chamber into which the measuring light beam is introduced; a built-in detector that is built into a main unit of a spectrophotometer; and an external detector disposed on an external accessory that can be mounted to or removed from the main unit; wherein: when a mountable/removable optical path switcher is installed in the specimen chamber, an optical path of the measuring light beam is switched from an ordinary optical path leading to the built-in detector to an external optical path leading to the external detector, and measurement based on detection signals from the built-in detector is replaced by measurement based on detection signals from the external detector; and further comprising: a measurement data threshold storage unit for storing a threshold value T for measurement data from the built-in detector or the external detector; and a light-receiving detector recognition unit for recognizing whether either the built-in detector or the external detector can receive the measuring light beam based on the result of a comparison of threshold value T to measurement data from the built-in detector or the external detector while the measuring light beam is introduced into the specimen chamber.

The optical path switcher may be installed as a single unit with the external accessory.

The light source unit may include a drive mechanism for changing the direction of a light source mirror, and the light-receiving detector recognition unit may compare threshold value T to the maximum value of the measurement data obtained during scanning of the direction of the light source mirror by the drive mechanism.

Furthermore, the spectrophotometer may further include a gain setting mechanism for setting the amplification factor of the detection signals from the built-in detector and the external detector, wherein, if measurement data from either detector does not exceed threshold value T, the light-receiving detector recognition unit compares threshold value T to measurement data after the gain setting mechanism has increased the amplification factor of the detection signals.

Furthermore, the spectrophotometer may store a second threshold value T2 (where T2>T) so that if measurement data exceeds the second threshold value T2, the light-receiving detector recognition unit compares threshold value T to measurement data after the amplification factor of the detection signal is decreased by the gain setting mechanism.

Effects of the Invention

With the present invention, the light-receiving detector recognition unit compares measurement data acquired by detecting the detection signal from the built-in detector while the measuring light beam is guided into the specimen chamber to a preset threshold value T. Threshold value T is a threshold value for excluding noise signals; values lower than threshold value T are considered noise. If measurement data acquired from the built-in detector exceeds threshold value T, the built-in detector is recognized as being able to receive the measuring light beam. Also, measurement data acquired by detecting the detection signal from an external detector is compared to a preset threshold value T. If measurement data acquired from the external detector exceeds threshold value T, the external detector is recognized as being able to receive the measuring light beam. To explain, since only one of the two detectors will exceed threshold value T depending on whether the optical path switcher is mounted in the specimen chamber or not, this allows the detector that is able to measure to be recognized.

If an optical path switcher is mounted but the external detector is not correctly installed (e.g., the detection signal cannot be transferred because a signal cable is not properly connected), the signal might not exceed threshold value T from either detector, so that state, too, becomes recognizable.

Correct measurement can then be easily performed without misoperations by performing at least one of the following controls: changing settings in keeping with the detector that the device status setting unit recognizes as being able to receive light or displaying a device status that shows either a normal measurement or measurement using an external accessory.

Furthermore, by using the present invention, once the external accessory including the external detector is correctly installed to the main unit of the spectrophotometer, the device status can thereafter be automatically recognized by software simply by installing or removing the optical path switcher with the external accessory still installed (without removing), and either measurements using the built-in detector or measurement using the external detector can be freely performed.

The device is initialized when the power is turned on and the spectrophotometer is started up from a completely stopped state. However, during the initialization process, since initialization adjustment is not performed on the light source mirror of the spectrometer, there is no guarantee that the measuring light beam is being emitted in such a way to reach the detector. Accordingly, the light-receiving detector recognition unit can accurately recognize the detector that is able to receive light by operating the light source mirror drive mechanism, scanning the direction of the light source mirror, and guiding the measuring light beam into the specimen chamber while comparing threshold value T to the maximum value of the measurement data obtained during scanning. After the detector that can receive light is identified, the identified detector is used to perform optical initialization (finding the origin) of the spectrometer. By so doing, a correct optical initialization is performed.

If, despite the scanning performed by the source mirror drive mechanism, the measurement data obtained from neither detector exceeds the threshold value T, it is acceptable to use the gain setting mechanism, which sets the amplification factor of the detection signal, to increase the amplification factor of the detection signals and to compare threshold value T against the measurement data that is obtained after increasing the amplification factor. This not only prevents the mistaken identification of noise as a detection signal because of the excessive amplification of the noise signal but also allows initially setting a sufficiently low amplification factor, which prevents excessive amounts of incident light to the detector due to the use of a high amplification factor and prevents damaging the detector.

In other words, if normal measurement results cannot be obtained when the measurement data exceeds threshold value T2, it is acceptable to compare threshold value T against the measurement data that is acquired after using a lowered amplification factor. If priority is given to the speed of light-receiving detector recognition, the time required to identify the light-receiving detector can be shortened by initially setting a high amplification factor that is likely to be optimal or an amplification factor in the center of the setting range and then raising or lowering the amplification factor to find the optimal amplification factor.

BRIEF DESCRIPTION OF THE FIGS.

MODES FOR PRACTICING THE INVENTION

Figure 1:
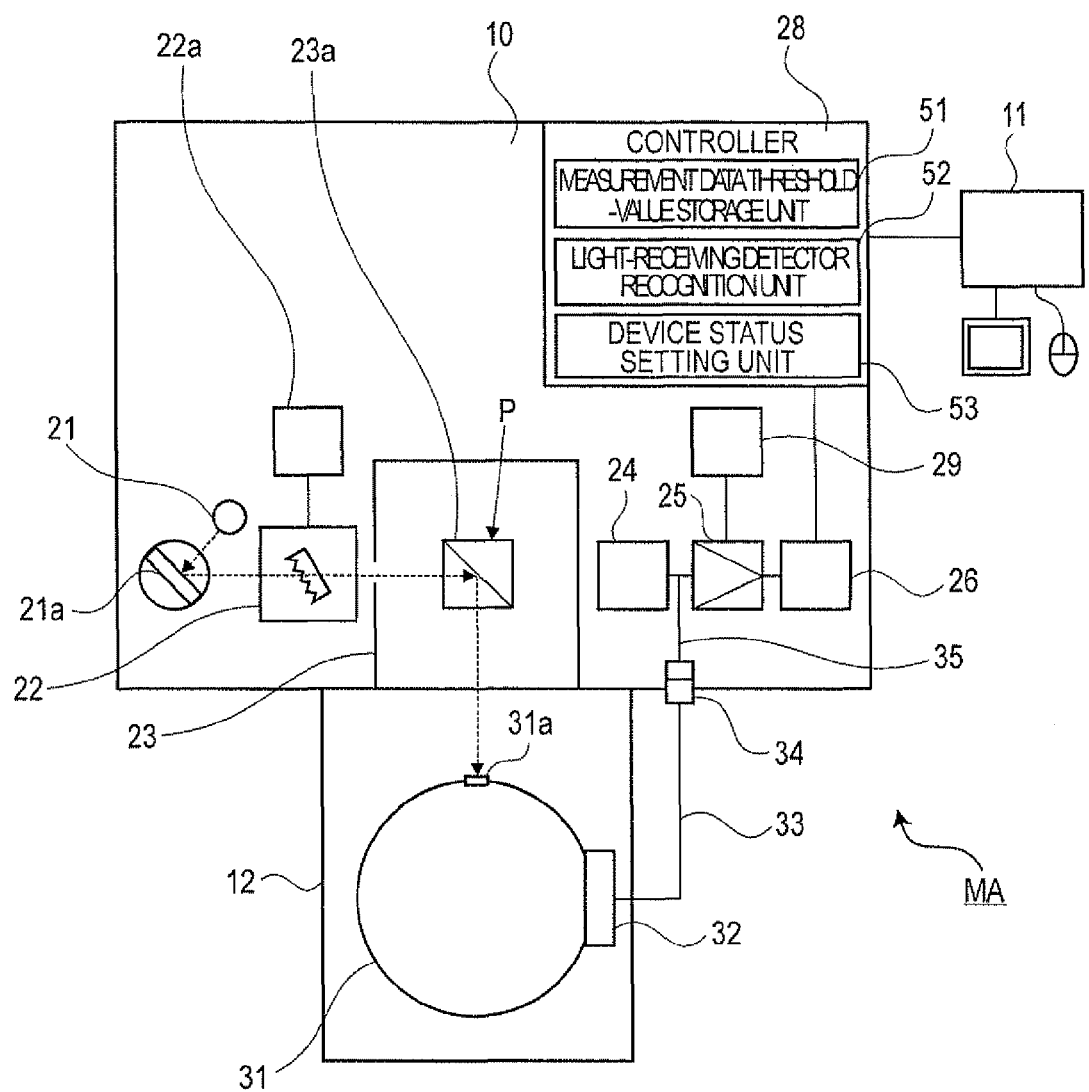
FIG. 1 is a block diagram that shows the configuration of a spectrophotometer that is an embodiment of the present invention.

The spectrophotometer of the present invention is described next with reference to figures. FIG. 1 is a block diagram that shows the configuration of a spectrophotometer MA that is an embodiment of the present invention. Components that are the same as in the previous spectrophotometer M shown in FIG. 5 are given the same numerical reference and their explanation is omitted.

Figure 5:
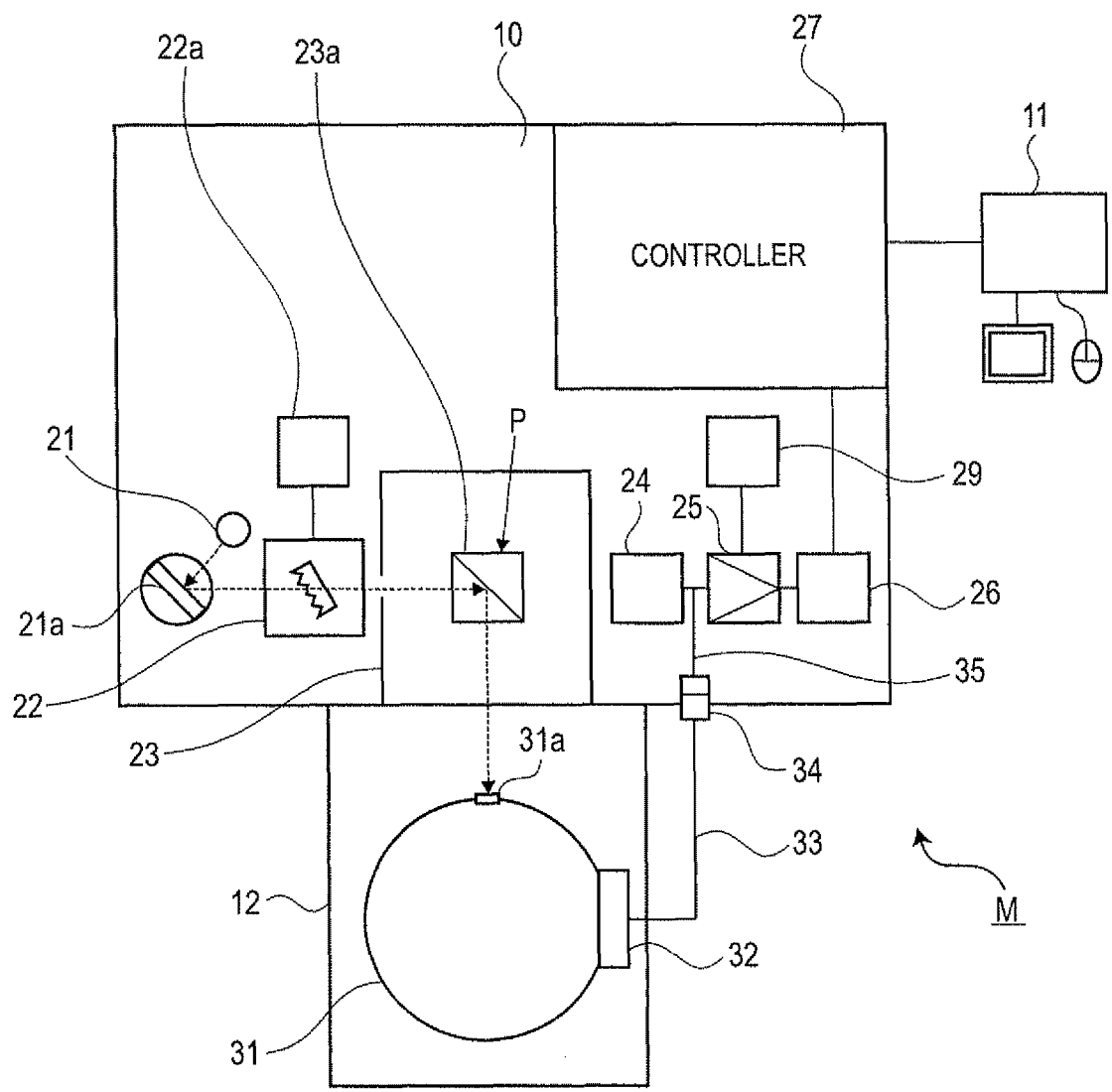
FIG. 5 is a schematic view showing an external accessory installed in a specimen chamber of the spectrophotometer.
Figure 6:
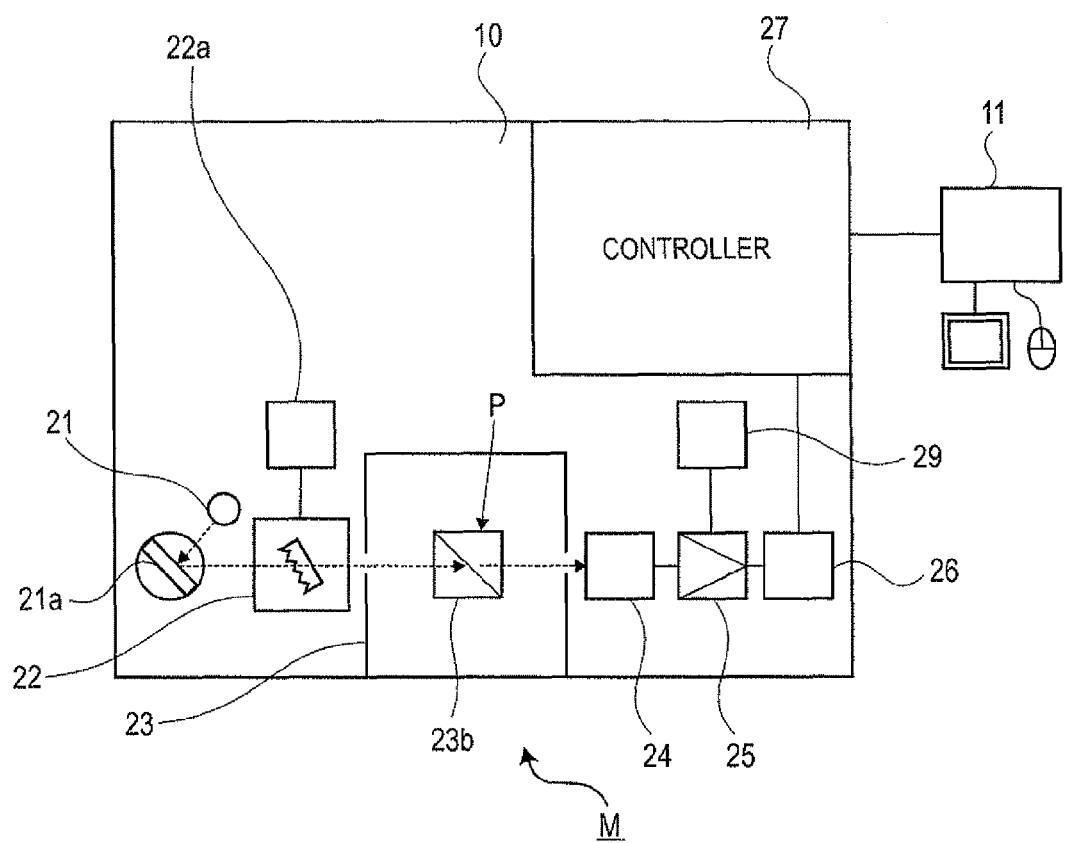
FIG. 6 is a schematic view showing the state (when measuring transmittance) where no external accessory is installed in the device of FIG. 5.

As is clear from the comparison of FIG. 5 and FIG. 1, the hardware configuration is the same except for controller 27 of spectrophotometer M being changed to controller 28 of spectrophotometer MA. In other words, with the present invention, the device configuration of previous spectrophotometer M can, as a general rule, be used without modification, enabling the present invention to be implemented solely by changing the software that is executed by controller 28, without adding new hardware resources.

The configuration of controller 28, which is the changed part, will be described below.

Controller 28 is firmware that includes a CPU and memory and which conducts control and processing for the entire device. Specifically, it stores programs and parameters required for device control in memory and controls device components such as light source 21, light source mirror drive mechanism 21a, wavelength stepping mechanism 22a of spectrometer 22, detector 24, gain adjustment mechanism 29 of signal amplifier 25, and external detector 32. The controller 28 realizes the necessary functions by performing operations on measurement data that is acquired from the detection signals such as computations, output processing, and input/output processing using data communications with personal computer 11.

To explain, in terms of functional blocks, the processing means that are added to controller 28 in order to implement the functions related to the present invention, controller 28 is equipped with measurement data threshold-value storage unit 51, light-receiving detector recognition unit 52, and device status setting unit 53.

Measurement data threshold-value storage unit 51 stores threshold value T for determining whether a signal is noise or actual measurement data based on measurement data acquired from built-in detector 24 or external detector 32 via signal amplifier 25 and A/D converter 26. Threshold value T may be changed according to the type of detector 24 or detector 32 or kept the same, so long as it is a value allows the identification of noise.

While the measuring light beam formed by light source 21 and spectrometer 22 is guided to specimen chamber 23, light-receiving detector recognition unit 52 compares stored threshold value T against measurement data acquired from detector 24 or detector 32, and identifies which detector the measuring light beam is reaching (being received by) to recognize the detector that currently can receive (measure) light. Since the detector that receives the measuring light beam switches depending on whether or not optical path switching mirror 23a (optical path switcher) is installed in specimen chamber 23, it recognizes which detector is receiving the measuring light.

Device status setting unit 53 changes settings to values appropriate to the detector based on the detector recognized as being able to receive light and displays device status, i.e., which detector is currently able to measure, on a monitor screen or the like. Parameters to be used for measuring using built-in detector 24 and parameters to be used for external accessory 12 or external detector 32 are entered in advance from personal computer 11 and stored in controller 28. To change the settings, the appropriate parameters are read based on the result of the recognition of which detector is able to receive light. The device status, i.e., whether built-in detector 24 or external detector 32 can perform the measurements, is displayed on the monitor screen of personal computer 11 and encourages the operator to make necessary setting changes.

Examples of operation flows for automatic recognition of detectors by spectrophotometer MA are described next.
Operational Flow 1

Figure 2:
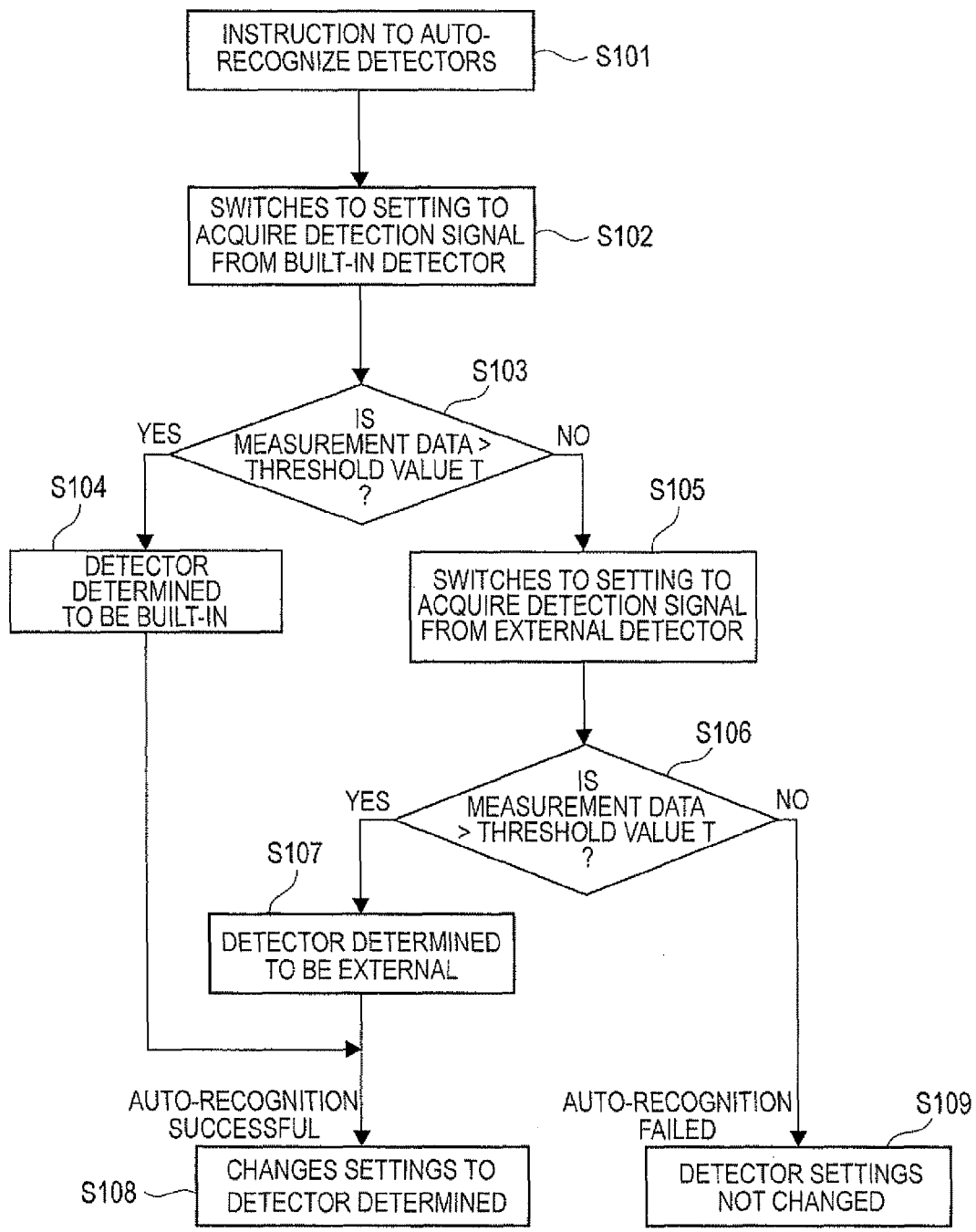
FIG. 2 is a flowchart that shows an example of the operation flow of the present invention using the device of FIG. 1.

FIG. 2 is a flowchart showing an example of the operation flow with the present invention. The operation flow is an automatic recognition process when device initialization has already been completed and no optical initialization is required. For example, this process may start when an automatic recognition instruction is manually entered after some anomaly or problem occurs during device operation. Alternatively, this process may start simultaneous with the start of measurement when the settings for the measurement operation have been defined to automatically perform the automatic recognition process prior to the start of measurements.

When the detector receives an instruction for auto-recognition process (S101), it switches to a setting to acquire detection signals from built-in detector 24 (S102). When this happens, external detector 32 is stopped or its corresponding signal line is shut off from signal amplifier 25. Since initialization is completed, the direction of the light source mirror of light source 21 should guide the measuring light beam to the specimen chamber. However, if that is not the case, the light source mirror is driven automatically by light source mirror drive mechanism 21a to guide the measuring light beam into the specimen chamber. Also, in some cases, the wavelength may be changed to the optimum wavelength for the type of detector used in auto-recognition.

The detection signals from detector 24 are then sent via signal amplifier 25 and A/D converter 26 to controller 28 as measurement data (digital data) and compared to threshold value T (S103). If the result shows that the measurement data is greater than threshold value T, the signal is identified as actual measurement data, and built-in detector 24 is determined to be the detector capable of measurement (S104).

If the measurement data is smaller than the threshold value, the controller switches to settings for acquiring the detection signals from external detector 32 (S105). When this happens, built-in detector 24 is stopped or its corresponding signal line is shut off from signal amplifier 25.

The detection signals from detector 32 are then sent via cable 33, connector 34, cable 35, signal amplifier 25 and A/D converter 26 to controller 28 as measurement data (digital data) and compared to threshold value T (S106). If the result shows that the measurement data is greater than threshold value T, the signal is identified as actual measurement data, and external detector 24 is determined to be the detector capable of measurement (S107).

The above recognizes which detector is capable of making the measurements (S104, S107).

Next, controller 28 changes the device settings according to the recognition results (S108). If the settings are to be manually changed by the operator, a message is displayed on the monitor screen of personal computer 11 indicating whether built-in detector 24 or external detector 32 is capable of measurement. If setting information has been stored beforehand in controller 28, settings are changed to (or maintained at) the corresponding settings information.

In step S106, if the measurement data is smaller than threshold value T, neither detector is capable of measurement, auto-recognition is not possible, and device settings remain unchanged (S109). When this happens, a message is displayed on the monitor screen of personal computer 11 stating that auto-recognition is not possible. This could possibly be caused by, for example, a bad connection to the device, such as cable 33 coming loose, so the operator is encouraged to run a check.

The amplification factor to be used for the auto-recognition of the light-incidence detector may be estimated from the previous light-incidence state or may be found by increasing from the initially set amplification factor to the extent that the measurement data does not exceed threshold value T. Alternatively, an amplification factor may be found by starting from the initially set factor that allows the measurement data to fall between threshold value T and second threshold value T2.

Operational Flow 2

Figure 3:
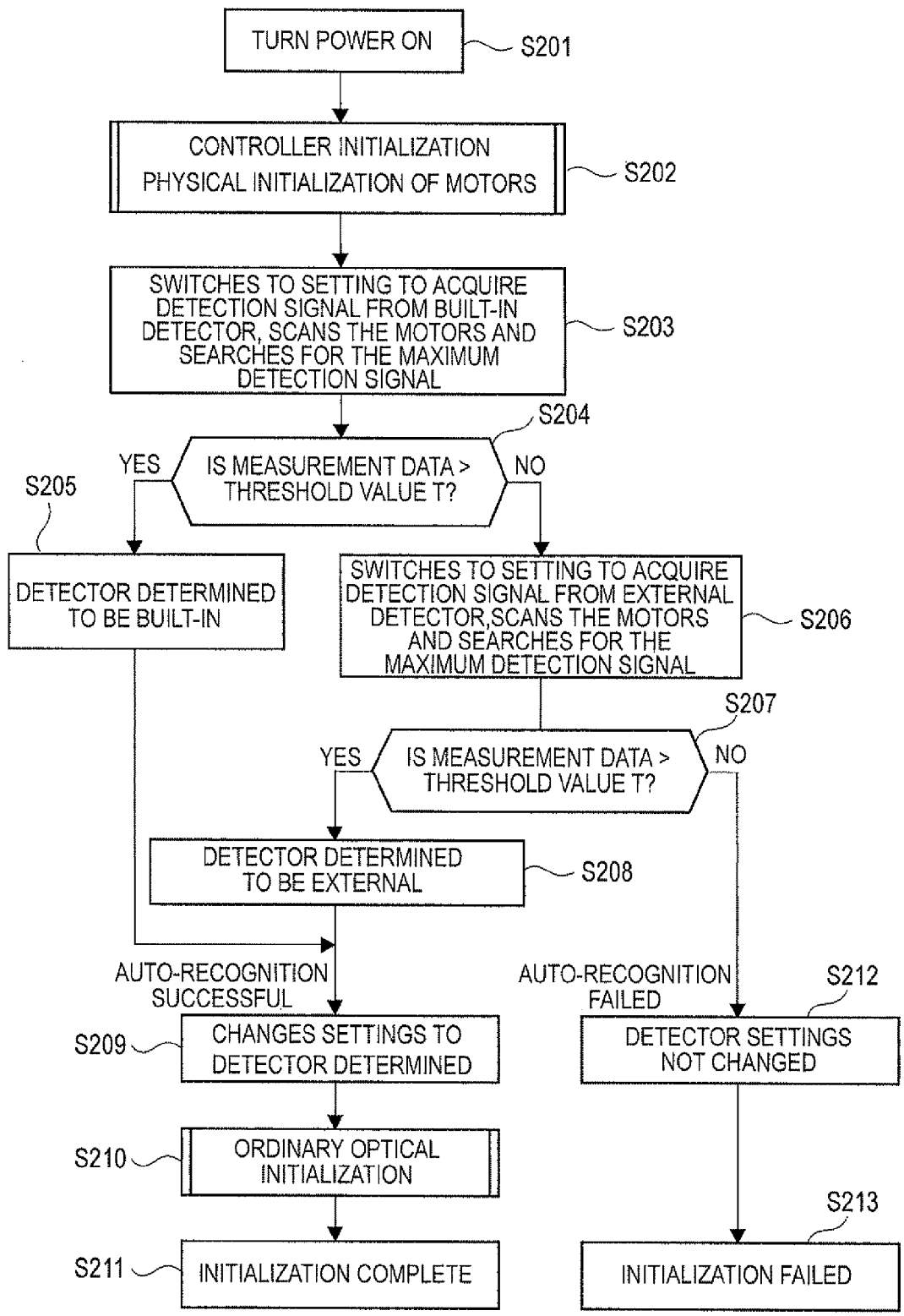
FIG. 3 is a flowchart that shows an example of the operation flow of the present invention using the device of FIG. 1.

FIG. 3 is a flowchart that shows an example of another operation flow of the present invention. This operation flow applies to auto-recognition at device startup. When the device is started up, auto-recognition is first run to find the detector capable of measurement, and then optical initialization is performed to fit the settings for that detector. "Optical initialization" refers to using the measuring light beam incident on the detector to perform such things as finding the optical origin to be used for wavelength stepping and setting the optimal direction of the light source mirror. The optical components disposed on the optical path of the measurement system include the light source mirror and diffraction grating of the spectrometer that is driven by the wavelength stepping mechanism. The light source mirror and wavelength stepping mechanism are examples of optical mechanisms that are driven by a motor. Prior to initialization, optical mechanisms driven by motors may not be in a state that allows the measuring light beam to reach the detector. For that reason, this operation flow uses an algorithm, which, during initialization, scans the optical mechanisms driven by the motor and adjusts the optical mechanisms to maximize the energy of the measuring light beam that reaches the detector. The comparison to threshold value T is performed after these measures are taken.

When power is turned on (S201), controller 28 starts initializing the device, and with optical mechanisms that are driven by motors (which includes at least light source mirror drive mechanism 21a), their motors are initialized (S202).

Settings are then switched to the settings for acquiring detection signals from built-in detector 24 (S203). Optical mechanisms that are driven by motors are scanned and adjusted to maximize the detection signals.

The detection signals from detector 24 are sent via signal amplifier 25 and A/D converter 26 to controller 28 as measurement data (digital data) and compared to threshold value T (S204). If the result shows that the measurement data (the measurement data corresponding to the maximum detection signal) obtained when the motor of light source mirror drive mechanism 21a is scanned is greater than threshold value T, the device is judged to be detecting actual measurement data rather than noise, and built-in detector 24 is determined to be the detector capable of measurement (S205).

If the measurement data in S204 is smaller than the threshold value, the device switches to settings to acquire detection signals from external detector 32 (S206). At this time, built-in detector 24 is stopped or the corresponding signal line is shut off from signal amplifier 25.

The detection signals from detector 32 are then sent via cable 33, connector 34, cable 35, signal amplifier 25 and A/D converter 26 to controller 28 as measurement data (digital data) and compared to threshold value T (S207). If the result shows that the measurement data is greater than threshold value T, the signal is identified as actual measurement data, and external detector 32 is determined to be the detector capable of measurement (S208).

The above completes the recognition of which detector is capable of measurement (S205, S208).

Next, controller 28 changes the device settings according to the recognition results (S209).

Regular optical initialization processing then starts (S210). In other words, the optical origin is found using the measuring light beam incident on the detector that is capable of measurement. This completes initialization of the device (S211).

If the measurement data is smaller than threshold value T in step 207, neither detector is capable of measurement, and a determination is made that auto-recognition is not possible.

The device settings remain unchanged (S212). At this time, a message is displayed on the monitor screen of personal computer 11 stating that auto-recognition is not possible. The above completes the operation flow with failed initialization (S213).

Operational Flow 3

Figure 4:
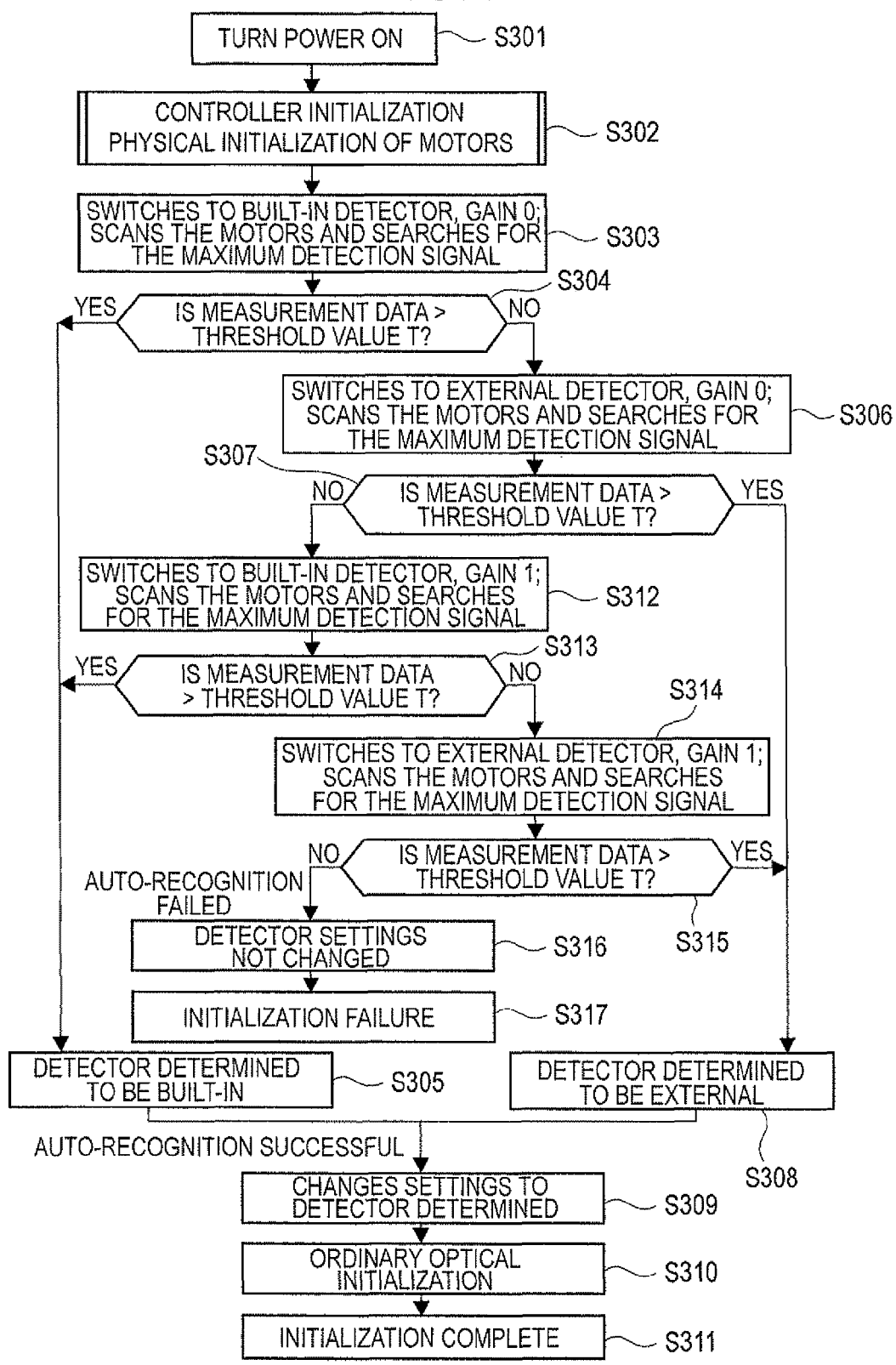
FIG. 4 is a flowchart that shows an example of the operation flow of the present invention using the device of FIG. 1.

FIG. 4 is a flowchart of yet another example of the operation flow of the present invention. In the flow described in FIG. 3, an algorithm was used that compared threshold value T to measurement data after the measuring light beam had been adjusted to maximize the energy of the measuring light beam that reaches the detector. With the latest example, the algorithm that is used performs the determination while adjusting the detection signal gain (the amplification factor of signal amplifier 25) so that the determination is made when the detector load is at the optimal state.

By so doing, an erroneous detection of noise as a detection signal caused by the signal falsely exceeding threshold T due to the gain being set too high from the beginning is avoided. For this reason, this method performs the determination while initially holding down the gain and increases the gain only if detection is not possible.

Alternatively, with detectors such as photomultipliers where a negative high-voltage is set for the detector and the amplification factor is adjusted, the incidence of large amounts of light when the amplification factor is high can damage the detector. To prevent this, a method is adopted that performs the determination while holding down the initial amplification factor. The amplification factor is then increased if detection is not possible.

Alternatively, if priority is placed on shortening the time required for initialization, a method is adopted whereby the initial amplification factor is set to an amplification factor that is likely to be optimal or at the center of the setting range. The determination is performed, and if the amplification factor turns out to be too high for obtaining a normal measurement result (i.e., second threshold value T2 is exceeded), the amplification factor is reduced. If the amplification factor turns out to be too low and threshold value T is not exceeded, the amplification factor is decreased. (This is not shown in the operation flow of FIG. 4.)

When power is turned on (S301), controller 28 starts initializing the device, and with optical mechanisms driven by motors (which includes at least light source mirror drive mechanism 21a), their motors are initialized (S302).

The settings are then changed to those for acquiring the detection signals from built-in detector 24. Gain adjustment mechanism 29 of signal amplifier 25 for changing the amplification factor of the detection signal from detector 24 initially sets gain to 0 and, for example, amplifies the detection signals by a basic amplification factor and sends the detection signals to A/D converter 26 for measurement. Optical mechanisms that are driven by motors (light source mirror drive mechanism 21a) are scanned and adjusted to maximize the detection signals (S303).

The detection signal of detector 24 is sent via signal amplifier 25 (at gain 0) and A/D converter 26 to controller 28 as measurement data (digital data) and compared to threshold value T (S304). If the result shows that the measurement data (i.e., the measurement data corresponding to the maximum detection signal) obtained when the motor of light source mirror drive mechanism 21a is scanned is greater than threshold value T, the detector is judged to be detecting actual measurement data rather than noise, and built-in detector 24 is determined to be the detector capable of measurement (S305).

If the measurement data in step S304 is smaller than the threshold value, the settings are changed to those for acquiring the detection signals from external detector 32 (S306). Gain adjustment mechanism 29 of signal amplifier 25 leaves gain at 0, and measurements are performed. At this time, built-in detector 24 is stopped, or the corresponding signal line is shut off from signal amplifier 25.

The detection signals from detector 32 are then sent via cable 33, connector 34, cable 35, signal amplifier 25 and A/D converter 26 to controller 28 as measurement data (digital data) and compared to threshold value T (S307). If the result shows that the measurement data is greater than threshold value T, the signal are identified as actual measurement data, and external detector 32 is determined to be the detector capable of measurement (S308).

The above completes the recognition of which detector is capable of measurement (S305, S308).

If the measurement data in S307 is smaller than the threshold value T, the settings are changed again to those for acquiring the detection signals from built-in detector 24. Gain adjustment mechanism 29 switches gain from gain 0 to gain 1 and, for example, changes the settings so that the magnitude of the detection signals is amplified to double the basic amplification factor. Optical mechanisms that are driven by motors (light source mirror drive mechanism 21a) are scanned and adjusted to maximize the detection signal (S312).

The detection signal of detector 24 is sent via signal amplifier 25 (at gain 1) and A/D converter 26 to controller 28 as measurement data (digital data) and compared to threshold value T (S313). If the result shows that the measurement data (the measurement data corresponding to the maximum detection signal) is greater than threshold value T, the detector is judged to be detecting actual measurement data rather than noise, and built-in detector 24 is determined to be the detector capable of measurement (S305).

If the measurement data in step S313 is smaller than the threshold value, the settings are changed to those for acquiring the detection signals from external detector 32 (S314). Gain adjustment mechanism 29 leaves gain at 1, and measurements are performed. At this time, built-in detector 24 is stopped, or the corresponding signal line is shut off from signal amplifier 25.

The detection signals from detector 32 are then sent via cable 33, connector 34, cable 35, signal amplifier 25 and A/D converter 26 to controller 28 as measurement data (digital data) and compared to threshold value T (S315). If the result shows that the measurement data is greater than threshold value T, the signals are identified as measurement data from external detector 32 of external accessory 12, and external detector 32 is determined to be the detector capable of measurement (S308).

Next, controller 28 changes the device settings according to the recognition results (S309).

Regular optical initialization processing then starts (S310). In other words, the optical origin is found using the measuring light beam incident on the detector that is capable of measurement. This completes initialization of the device (S311).

If the measurement data is smaller than threshold value T in step 315, neither detector is capable of measurement, and a determination is made that auto-recognition is not possible. The device settings remain unchanged (S316). At this time, a message is displayed on the monitor screen of personal computer 11 stating that auto-recognition is not possible. The above completes the operation flow with failed initialization (S317).

In this way, during of after initialization at device startup, whether built-in detector 24 or external detector 32 is capable of measurement is recognized, and measurement without misoperations is performed.

The foregoing described typical embodiments of the present invention, but the present invention is not limited to the afore-described embodiments. Various modifications and changes are possible without deviating from the gist of the claims.

For example, optical path switching mirror 23a (optical path switcher) may be installed as a single unit with external accessory 12. Specifically, a part of external accessory 12 may be configured to protrude into specimen chamber 23, and optical path switching mirror 23a maybe disposed on the part of external accessory 12 that is inside the specimen chamber 23.

Also, if the detector is a photomultiplier as described in parts of this specification, the amplification factor may be adjusted not by an amplification circuit 25 but by the detector itself.

Also, separate amplifier circuits 25 and A/D converters 26 may be used by the built-in detector and the external detector and then integrated at the point where digital data is acquired.

Other variations include not performing amplification at all, or if two or more amplification gains are used, the change in amplification factor when gain is increased by 1 may not always be double.

Also, digitization of the data may be accomplished by a method other than the use of an A/D converter. Also, the spectrometer maybe located not between the specimen chamber and the light source but between the specimen chamber and the detector.

These modes of practicing the invention are merely changes to circuitry and configuration and do not have a direct relationship to the object of the present invention and are all covered by the claims.

INDUSTRIAL APPLICABILITY

The present invention can be used in spectrophotometers wherein external detectors can be installed and removed.

DESCRIPTION OF THE NUMERICAL REFERENCES

10. Spectrophotometer (main unit)
11. Personal computer
12. External accessory
21. Light source
22. Spectrometer
22a. Wavelength stepping mechanism
23. Specimen chamber
23a. Light path switching mirror (optical path switcher)
24. Detector (built-in)
25. Signal amplifier
26. A/D converter
28. Controller
31. Integrating sphere
32. Detector (external)
51. Measurement data threshold value storage unit
52. Light-receiving detector recognition unit
53. Device status setting unit

What is claimed is:
1. A spectrophotometer comprising:
a light source unit for forming a measuring light beam for spectrometry;
a specimen chamber into which said measuring light beam is introduced;
a built-in detector that is built into a main unit of a spectrophotometer; and an external detector disposed on an external accessory that can be mounted to or removed from said main unit;

wherein a mountable/removable optical path switcher is installed in said specimen chamber, for switching an optical path of said measuring light beam is switched from an ordinary optical path leading to said built-in detector to an external optical path leading to said external detector, and measurement based on detection signals from said built-in detector is replaced by measurement based on detection signals from said external detector; and further comprising:

a measurement data threshold storage-value unit for storing a threshold value T for measurement data from said built-in detector or said external detector; and a light-receiving detector recognition unit for recognizing whether either said built-in detector or said external detector can receive said measuring light beam based on the result of a comparison of threshold value T to measurement data from said built-in detector or said external detector while said measuring light beam is introduced into the specimen chamber.

2. The spectrophotometer according to claim 1 wherein said optical path switcher is installed as a single unit with said external accessory.

3. The spectrophotometer according to either claim 1 or claim 2 wherein:

said light source unit comprises a drive mechanism for changing the direction of a light source mirror; and said light-receiving detector recognition unit compares threshold value T to the maximum value of the measurement data obtained during scanning of the direction of the light source mirror by said drive mechanism.

4. A spectrophotometer comprising:

a light source unit for forming a measuring light beam for spectrometry;

a specimen chamber into which said measuring light beam is introduced;

a built-in detector that is built into a main unit of a spectrophotometer; and an external detector disposed on an external accessory that can be mounted to or removed from said main unit;

wherein a mountable/removable optical path switcher is installed in said specimen chamber, an optical path of said measuring light beam is switched from an ordinary optical path leading to said built-in detector to an external optical path leading to said external detector, and measurement based on detection signals from said built-in detector is replaced by measurement based on detection signals from said external detector; and further comprising:

a measurement data threshold storage-value unit for storing a threshold value T for measurement data from said built-in detector or said external detector;

a light-receiving detector recognition unit for recognizing whether either said built-in detector or said external detector can receive said measuring light beam based on the result of a comparison of threshold value T to measurement data from said built-in detector or said external detector while said measuring light beam is introduced into the specimen chamber; and a gain setting mechanism for setting the amplification factor of the detection signals from said built-in detector and said external detector, wherein, if measurement data from either detector does not exceed threshold value T, said light receiving detector recognition unit compares threshold value T to measurement data after said gain setting mechanism has increased the amplification factor of the detection signals.

5. A spectrophotometer comprising:

a light source unit for forming a measuring light beam for spectrometry;

a specimen chamber into which said measuring light beam is introduced;

a built-in detector that is built into a main unit of a spectrophotometer; and an external detector disposed on an external accessory that can be mounted to or removed from said main unit;

wherein a mountable/removable optical path switcher is installed in said specimen chamber, an optical path of said measuring light beam is switched from an ordinary optical path leading to said built-in detector to an external optical path leading to said external detector, and measurement based on detection signals from said built-in detector is replaced by measurement based on detection signals from said external detector; and further comprising:

a measurement data threshold storage-value unit for storing a threshold value T for measurement data from said built-in detector or said external detector;

a light-receiving detector recognition unit for recognizing whether either said built-in detector or said external detector can receive said measuring light beam based on the result of a comparison of threshold value T to measurement data from said built-in detector or said external detector while said measuring light beam is introduced into the specimen chamber; and a gain setting mechanism for setting the amplification factor of the detection signals from said built-in detector and said external detector, wherein said measurement data threshold-value storage unit is for further storing a second threshold value T2 (where T2>T) for measurement data from said built-in detector and said external detector;

wherein measurement data is acquired from said built-in detector or said external detector while said measuring light beam is introduced into the specimen chamber;

said gain setting mechanism lowers the amplification factor of said detection signals if said measurement data exceeds said second threshold value T2;

one of the detectors is recognized as being able to receive the measuring light beam based on the results of a comparison between said measurement data and said threshold value T; and if measurement data from neither of the detectors exceeds the threshold value T, said gain setting mechanism increases the amplification factor of the detection signals, and the measurement data are then compared to threshold value T.

* * * * *